US008118170B2

(12) United States Patent
Sato

(10) Patent No.: US 8,118,170 B2
(45) Date of Patent: Feb. 21, 2012

(54) PARTICULATE SIZE CLASSIFICATION APPARATUS AND METHOD

(75) Inventor: Shintaro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1466 days.

(21) Appl. No.: 11/649,883

(22) Filed: Jan. 5, 2007

(65) Prior Publication Data

US 2010/0252486 A1 Oct. 7, 2010

(30) Foreign Application Priority Data

Jan. 6, 2006 (JP) ................................ 2006-001166
Dec. 15, 2006 (JP) ................................ 2006-338893

(51) Int. Cl.
*B07B 4/00* (2006.01)
*B01D 45/00* (2006.01)

(52) U.S. Cl. ..... 209/135; 209/134; 209/137; 209/139.1; 209/142; 95/31; 95/32

(58) Field of Classification Search ....... 209/133–139.1, 209/142, 143, 154; 95/31, 32
See application file for complete search history.

(56) References Cited

U.S. PATENT DOCUMENTS 4,788,082 A * 11/1988 Schmitt ...................... 427/248.1
5,747,180 A * 5/1998 Miller et al. .................. 428/601
6,938,777 B2 * 9/2005 Call et al. ...................... 209/143
7,275,453 B2 10/2007 Ishikawa et al.
7,338,582 B2 * 3/2008 Suzuki et al. ............ 204/298.13
7,578,973 B2 * 8/2009 Call et al. ........................ 422/83
2010/0275561 A1 * 11/2010 Lundquist et al. .............. 55/456

FOREIGN PATENT DOCUMENTS

JP 59-029068 2/1984
JP 2005-022886 1/2005
JP 2005-091118 4/2005
JP 2007-526478 9/2007
WO WO-2006/001852 1/2006

OTHER PUBLICATIONS

T. Orii et al., Tunable, narrow-band light emission from size-selected Si nanoparticles produced by pulsed-laser ablation, Applied Physics Letters, Oct. 20, 2003, vol. 83, No. 16, pp. 3395-3397.
Shouheng Sun et al., Monodisperse FePt Nanoparticles and Ferromagnetic FePt Nanocrystal Superlattices, Science, Mar. 17, 2000, vol. 287, pp. 1989-1992.
Virgil A. Marple et al., Inertial, Gravitational, Centrifugal, and Thermal Collection Techniques, Aerosol Measurement Principles, Techniques, and Applications, Second Edition, Edited by Paul A. Baron et al., 2001, pp. 229-247.
Nobuyasu Suzuki et al., Monodispersed, nonagglomerated silicon nanocrystallites, Applied Physics Letters, Apr. 2, 2001, vol. 78, No. 14, pp. 2043-2045.
"Japanese Office Action" mailed by JPO and corresponding to Japanese application No. 2006-338893 on Nov. 30, 2010, with English translation.

* cited by examiner

*Primary Examiner* — Joseph C Rodriguez
(74) *Attorney, Agent, or Firm* — Fujitsu Patent Center

(57) ABSTRACT

Particulates called nanoparticles (principally having a diameter of 10 nm or less) are reliably and easily according to size with high throughput. An impactor includes a particulate size classifying chamber provided with an exhaust port for particulates, a nozzle ejecting to the inside of the particulate size classifying chamber a carrier gas containing particulates to be classified, and a trapping plate as particulate trapping unit provided in the particulate size classifying chamber and selectively trapping particulates ejected from the nozzle.

19 Claims, 9 Drawing Sheets

WHEN USING NOZZLE HAVING INNER DIAMETER OF 3.25 mm

FIRST EXHAUST PORT=0 sccm, SECOND EXHAUST PORT=500 sccm

FIRST EXHAUST PORT=0 sccm, SECOND EXHAUST PORT=1000 sccm

FIRST EXHAUST PORT=500 sccm, SECOND EXHAUST PORT=500 sccm

CASE OF ABSENCE OF IMPACTOR
($d_g$: GEOMETRICAL AVERAGE, $\sigma_g$: GEOMETRICAL STANDARD DEVIATION)

PARTICULATE SIZE DISTRIBUTION WHEN USING IMPACTOR OF THE PRESENT INVENTION

PARTICULATE SIZE CLASSIFICATION APPARATUS AND METHOD

CROSS-REFERENCE TO RELATED APPLICATIONS

This application is based upon and claims the benefit of priority from the prior Japanese Patent Application Nos. 2006-338893, filed on Dec. 15, 2006, and 2006-001166, filed on Jan. 6, 2006, the entire contents of which are incorporated herein by reference.

BACKGROUND OF THE INVENTION

1. Field of the Invention

The present invention relates to a particulate size classification apparatus and method classifying sizes of nanoparticles to be used in the fields of luminescent materials, cosmetics, electronics, catalysts, and many others.

2. Description of the Related Art

Since particulates having sizes of the order of nanometers, so called nanoparticles, generally have a unique property presented due to size effects, or a large specific surface area, studies pursing their applications have been vigorously conducted in many areas in recent years. As examples of such applications, use of silicon nanoparticles as luminescent materials (see, for example, Non-Patent Document 1) or use of titanium oxide nanoparticles is known, and in any application, it is very important to control the sizes of nanoparticles.

[Patent Document 1] Japanese Patent Application Laid-Open No. 2005-22886

[Non-Patent Document 1] T. Orii et al., Appl. Phys. Lett. 83 (2003)3395

[Non-Patent Document 2] Shouheng Sun et al., Science 287, 1989 (2000)

[Non-Patent Document 3] P. A. Baron, K. Willeke, Aerosol Measurements Principles, Techniques, and Applications, 2nd ed. Wiley, New York, 2001

[Non-Patent Document 4] Suzuki et al., APPLIED PHYSICS LETTER, VOL. 78, page 2043, 2001

Methods for producing nanoparticles may be classified mainly into methods with liquid phase systems and methods with gas phase systems, and the method using a reaction in a liquid phase system (see, for example, Non-Patent Document 2) has an advantage that particles have relatively uniform sizes, but raises a concern of existence of impurities regarding electric applications intended by the present inventor because the method uses surfactants, organic solvents and the like.

In the method using a reaction in a gas phase system, for example a laser ablation method or a plasma CVD (Chemical Vapor Deposition) method, clean particulates are generally obtained, but it is not easy to obtain particles having uniform sizes. For classifying the sizes of such particles, a differential mobility analyzer (DMA) is often used.

The DMA is an apparatus classifying particulates according to size using the electric mobility of particulates in a gas, and it is frequently used in areas of aerosols. The DMA is also often used in the subsidiary research institute of the inventor, since particle sizes can be made uniform satisfactorily when nanoparticles are classified using the DMA (see, for example, Patent Document 1).

However, the DMA is not perfect, and has a disadvantage that is considered fetal on some application areas. The disadvantage is that the amount of particulates (throughput) obtained through classification is very small particularly when the DMA is used for classification of nanoparticles.

Normally, in size classification by the DMA, it is necessary that particulates be charged, but it is difficult to charge nanoparticles, especially nanoparticles of 10 nm or less, with high efficiency, and therefore the aforementioned problem occurs. In this connection, the probability that particulates having sizes of, for example, 10 nm or less are obtained through size classification by the DMA is at most 2 to 3% of the amount of such particulates that actually exist. This raises a very serious problem when particulates having uniform sizes are put to practical use on a commercial basis.

SUMMARY OF THE INVENTION

The present invention has been made in view of the problem described above and its object is to provide a particulate size classification apparatus and method allowing reliable and easy size classification of particulates called nanoparticles (principally with diameters of 10 nm or less) with high throughput.

The particulate size classification apparatus of the present invention comprises a particulate size classifying chamber provided with an exhaust port for particulates, particulate introducing unit having a nozzle ejecting to the inside of the particulate size classifying chamber a carrier gas containing particulates to be classified, and particulate trapping unit provided in the particulate size classifying chamber and selectively trapping particulates ejected from the nozzle, wherein among the particulates ejected from the nozzle, particulates made uniform in size by not being trapped by the particulate trapping unit are ejected from the exhaust port.

In the particulate size classification method of the present invention, a carrier gas containing particulates to be classified is ejected to the inside of a particulate size classifying chamber, particulates are selectively trapped by particulate trapping unit provided in the particulate size classifying chamber, and particulates made uniform in size by not being trapped by the particulate trapping unit are collected.

DETAILED DESCRIPTION OF THE PREFERRED EMBODIMENTS

The present invention uses a method making use of the inertia of particulates rather than depending on the charge state of particulates for performing size classification of particulates with high throughput. Specifically, so called an impactor is used under a low pressure to perform size classification of particulates.

Figure 1:
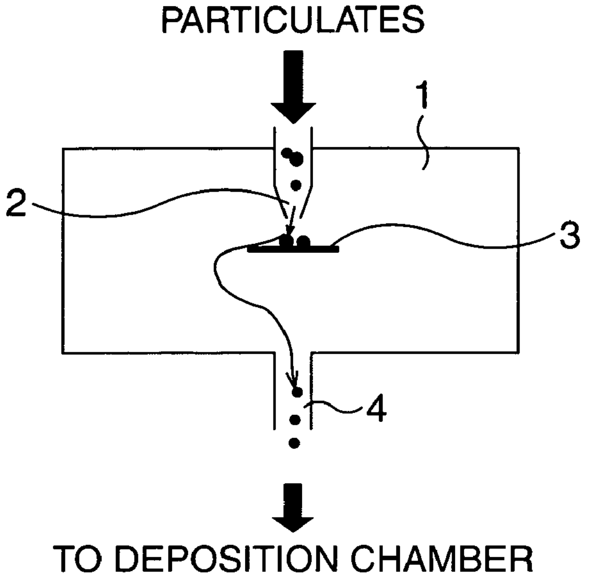
FIG. 1 is an explanatory view of essential parts necessary for understanding the principle of an impactor of the present invention.

FIG. 1 is an explanatory view of essential parts necessary for understanding the principle of the impactor of the present invention.

The impactor comprises a particulate size classifying chamber 1 provided with an exhaust port 4 for particulates, a nozzle 2 for ejecting to the inside of the particulate size classifying chamber 1 a carrier gas containing particulates to be classified, a trapping plate 3 as particulate trapping unit provided in the particulate size classifying chamber 1 and selectively trapping particulates ejected from the nozzle 2.

As shown in the figure, the impactor has the trapping plate (baffle plate) 3 placed at the front of the nozzle 2, and among particulates carried with a gas, those having a size equal to or a greater than a certain level, hence those having an inertia equal to or greater than a certain level, cannot follow the flow of the gas, collide against the trapping plate 3 placed in the downstream of the nozzle 2, and are thereby trapped. Here, whether or not particulates are trapped is normally described by a dimensionless parameter (function of the particulate size, the inner diameter of the nozzle 2, the gas velocity and so on) called the Stokes number (Non-Patent Document 2). In this impactor, particulates (of same size) made uniform in size by not being trapped by the trapping plate 3 are ejected through the exhaust port 4 and collected.

The impactor is used for trapping particulates principally of submicron or micron size in the area of aerosols. In the present invention, various modifications are made for applying such an impactor for size classification of nanoparticles.

Figure 2:
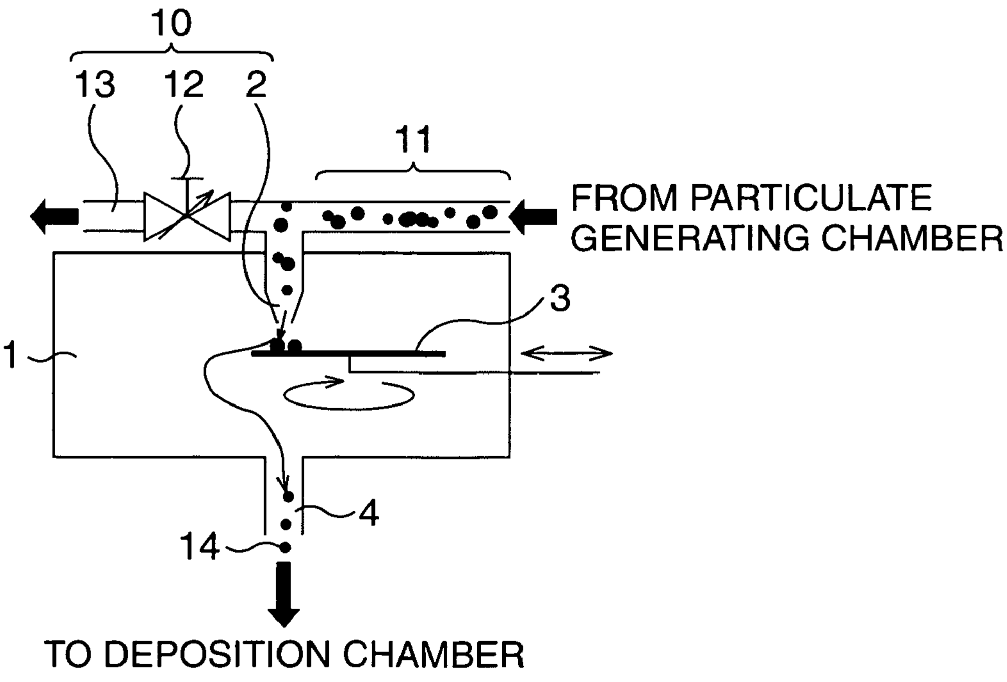
FIG. 2 is an explanatory view of essential parts showing a particulate size classification apparatus according to the embodiment.

FIG. 2 is an explanatory view of essential parts showing the particulate size classification apparatus according to this embodiment. Here, symbols same as those used in FIG. 1 denote same parts or have same meanings.

This particulate size classification apparatus comprises a particulate size classifying chamber 1, a particulate introducing section 10 having a nozzle 2, and a trapping plate 3.

The particulate introducing section 10 comprises in addition to the nozzle 2 a transportation pipe 11 for transporting a carrier gas containing particulates, a gas exhaust port 13 for the carrier gas provided separately from the nozzle 2, and a conductance adjusting valve 12 provided in the upstream of the gas exhaust port 13 and adjusting the flow rate of the carrier gas. Here, reference numeral 14 denotes a particulate classified and ejected from the exhaust port 4.

The trapping plate 3 is a discoid member having a surface having a porous structure, having a rotational axis perpendicular to the surface and made rotatable at a predetermined speed, and is placed so as to be movable (slidable) vertically and laterally. Further, the trapping plate 3 has a structure such that it can be replaced under a low pressure or in vacuum. This structure will be described in detail later.

In this embodiment, as particulates classified according to size, those ejected to the downstream of the impactor are used. Normally, the impactor acts to trap particulates of sizes equal to or greater than a certain size, and therefore particulates in the downstream include all particulates of sizes smaller than the certain size, and generally have a broad distribution of sizes.

Since nanoparticles, especially nanoparticles of 10 nm or smaller, cannot stably retain their existence, and the number of nanoparticles of small sizes decreases over time due to coagulation and the like, there is a lower limit on the particle size. As a result, the size classification apparatus sufficiently functions merely by removing nanoparticles of large sizes.

In the present invention, the degree of decrease in the number of aforementioned nanoparticles of small sizes is controlled to actively control the lower limit on the size of nanoparticles.

For employing the impactor in the particulate size classification apparatus of the present invention, the impactor is subjected to various modifications in performing classification of nanoparticles, and those modifications will be summarized below.

(1) Use of Low Pressure

For performing classification by making use of the inertia of nanoparticles of 10 nm or less, it is preferable that the inside of the particulate size classifying chamber 1 is kept at a low pressure, for example $2.67\times10^3$ Pa (20 Torr) or less at the time of size classification of particulates. For this purpose, for example, the inside of the particulate size classifying chamber 1 may be evacuated by a vacuum pump or the like to adjust the pressure to be a predetermined value of $2.67\times10^3$ Pa or less.

(2) Use of Helium Gas

For using the impactor with good controllability, it is necessary to use the impactor at a gas velocity equal to or less than a sonic velocity. Generally, classification of small nanoparticles becomes easier as the gas velocity increases, and therefore a helium gas inert and having a high sonic velocity is used.

(3) Mechanism for Replacement of Nozzle 2 and Trapping Plate 3

For controlling the aforementioned stokes number, it is necessary to change the diameter of the nozzle 2, but because of the low-pressure circumstance, a mechanism capable of replacing the nozzle 2 without disturbing the set low-pressure (vacuum) state was provided. Since excessive deposition of particulates on the trapping plate 3 deteriorates the classification performance, a mechanism scanning the trapping plate 3 to the nozzle 2 and a mechanism capable of replacing the trapping plate 3 in vacuum were provided.

(4) Installation of Gas Exhaust Port 13 Capable of Conductance Adjustment in Upstream of Nozzle 2

The exhaust port 13 in the upstream of the nozzle is normally connected directly to a pump or the like through the conductance adjusting valve 12, and particulates carried with a gas are discarded. The exhaust port 13 may be connected to another deposition chamber rather than the pump. By controlling the amount of exhaust gas from the exhaust port 13 and the flow rate of the gas to the nozzle 2, particles of small sizes can be removed using diffusion losses/coagulation in the transportation pipe 11, or conversely, small particles can be introduced in a larger amount to the downstream of the nozzle 2. Details there of will be described later as an example.

(5) Application of New Material to Trapping Plate 3

Conventionally, a silicone oil is coated on the surface of the trapping plate for preventing the rebound of particulates colliding against the trapping plate in the impactor (see, for example, Non-Patent Document 3). However, when cleanliness is required, for example when nanoparticles are used in electric applications, a trapping plate coated with a silicone oil, or the like, cannot be used. In the present invention, for solving this problem, the surface of the trapping plate 3 is modified. Specifically, a trapping plate having a surface having a complicated porous structure, such as an aluminum anodized plate, is used. By this complicated structure, the rebound of nanoparticles can be prevented. A trapping plate having nanostructures such as carbon nanotubes grown or coated on a substrate is also effective.

EXAMPLES

In the present invention, the impactor could be used effectively for size classification of nanoparticles as a result of making various improvements described above. Details of the present invention are described below using various embodiments.

Example 1

Figure 3:
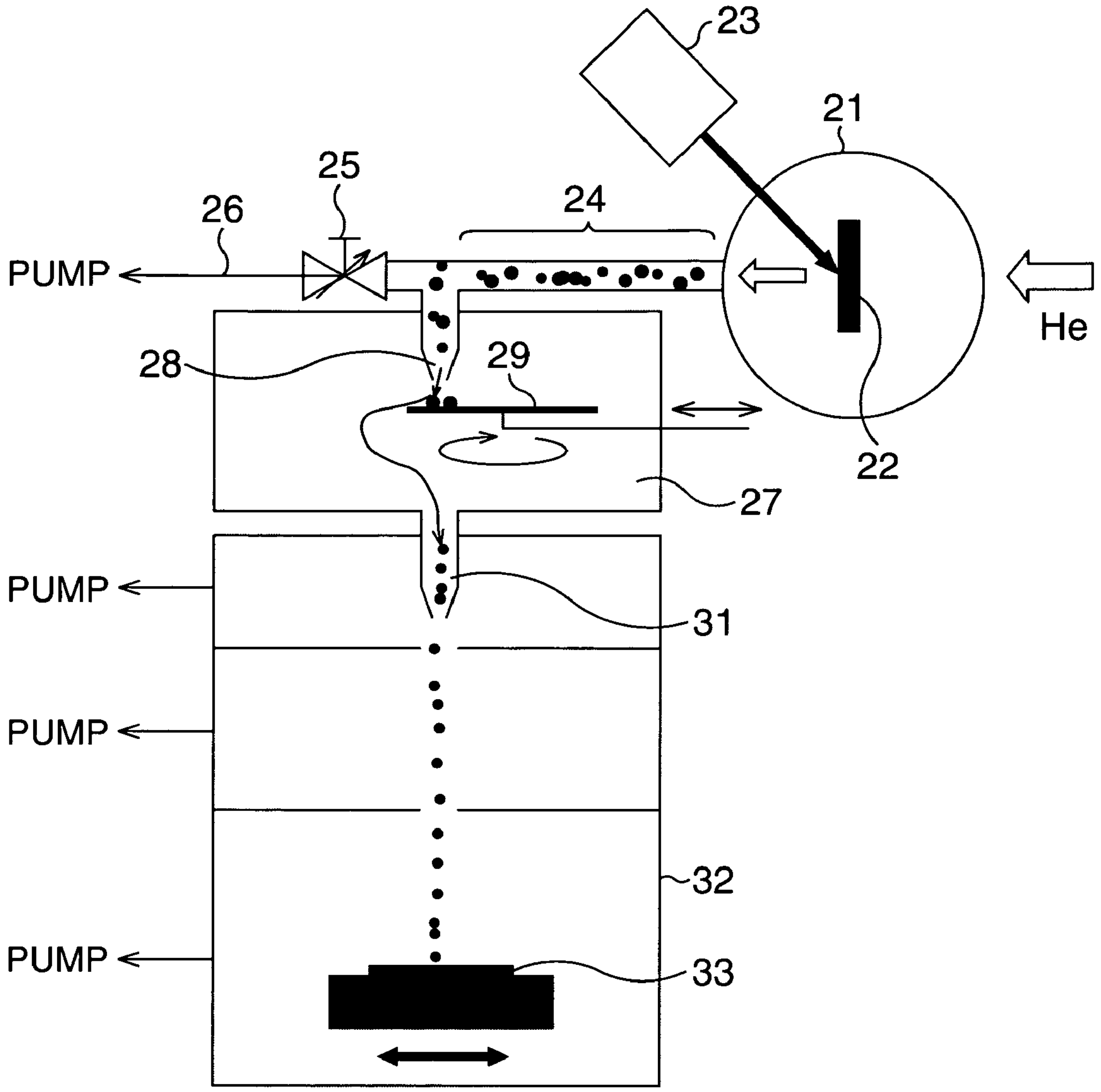
FIG. 3 is an explanatory view of essential parts showing the particulate size classification apparatus of example 1.

FIG. 3 is an explanatory view of essential parts showing a particulate size classification apparatus of example 1.

As shown in the figure, reference numeral 21 denotes a particle generating chamber, reference numeral 22 denotes a target of cobalt, reference numeral 23 denotes a pulse laser made of Nd:YAG, reference numeral 24 denotes a transportation pipe for a carrier gas containing particulates, reference numeral 25 denotes a conductance adjusting valve, reference numeral 26 denotes a conductance adjusting gas exhaust port, reference numeral 27 denotes a particulate size classifying chamber, reference 28 denotes a nozzle, reference numeral 29 denotes a trapping plate, reference numeral 31 denotes an exhaust port, reference numeral 32 denotes a particulate deposition chamber, and reference numeral 33 denotes a substrate. The emission wavelength of the Nd:YAG laser 23 is 532 nm, the output is 4 W, the repeated frequency is 20 Hz, the tip orifice diameter of the nozzle 28 is 3.25 mm, and the pressure of the inside of the particulate deposition chamber 32 is adjusted to be $1.33\times10^{-3}$ Pa ($10^{-5}$ Torr).

In this example, cobalt particulates are generated by laser ablation of the target 22 made of cobalt. Namely, the target 22 made of cobalt, which is placed in the particulate generating chamber 21 adjusted to have a pressure of $6.67\times10^{2}$ Pa to $1.33\times10^{3}$ (5 Torr to 10 Torr), is irradiated with a laser beam generated by the pulse laser 23 to generate a cobalt vapor.

The vapor is quenched by a carrier gas flowing at a flow rate of 0.5 slpm to 1 slpm (standard liters per minute) and consisting of He to generate particulates. The particulates are transported through the transportation pipe 24 having a length of about 1 m to an impactor section having the nozzle 28 and the trapping plate 29 as main elements.

In the upstream of the nozzle 28, the conductance adjusting exhaust port 26 is provided via the valve 25 capable of conductance adjustment, and connected from that point onward to a vacuum pump. In this example, the valve 25 is adjusted, whereby 0 to 0.5 slpm of helium flows to the exhaust port 26, and remaining helium is guided to the nozzle 28 together with particulates. Here, setting the flow rate of helium from the exhaust port 26 to 0 is equivalent to a configuration in which none of the valve 25 and the exhaust port 26 is provided on a particulate introducing section and only the nozzle 28 is an ejection port for particulate-containing helium introduced into the transportation pipe 24. In this case, in this example, the valve 25 may be adjusted so that the flow rate of helium from the exhaust port 26 is 0, or none of the valve 25 and the exhaust port 26 may be provided on the particulate introducing section. In this connection, in FIG. 3, the transportation pipe and the nozzle are placed perpendicularly to each other and the transportation pipe and the conductance adjusting gas exhaust port are placed horizontally to each other, but the positional relationship is not limited thereto.

Figure 4:
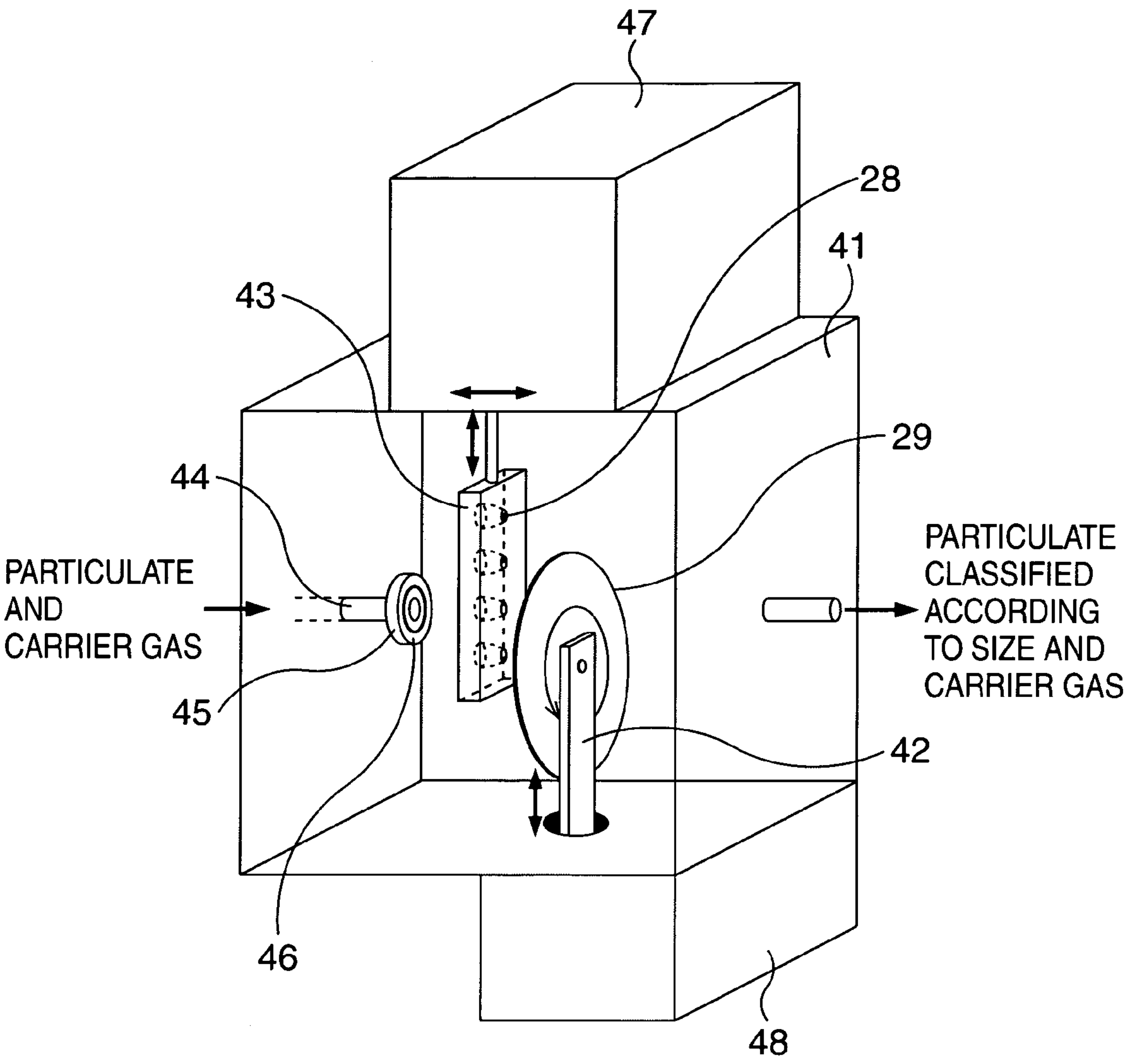
FIG. 4 is a slant view of essential parts showing the details of the impactor in example 1.

FIG. 4 is a slant view of essential parts showing the details of the impactor in example 1. Here, symbols same as those used in FIG. 3 denote same parts or have same meanings.

In FIG. 4, reference numeral 41 denotes a particulate size classifying chamber kept at a low pressure or in vacuum, reference numeral 42 denotes a holder of a trapping plate 29, reference numeral 43 denotes a nozzle plate having a plurality of ejection ports 28 of nozzles having different tip orifice diameters, reference numeral 44 denotes a tube provided separately from the ejection port 28 and intended for introducing a carrier gas containing particulates, reference numeral 45 denotes a flange, reference numeral 46 denotes an O-ring, reference numeral 47 denotes a drive mechanism for the nozzle plate 43, and reference numeral 48 denotes a drive mechanism for the trapping plate 29.

In the nozzle plate 43 shown in the figure, a plurality of ejection ports 28 of nozzles having different tip orifice diameters are provided on, for example, a plate having a thickness of about 10 mm, and by moving the nozzle plate 43 up and down, any of a plurality of ejection ports 28 can be selected.

In this example, a plurality of ejection ports 28 having tip orifice diameters of 4 mm, 3.6 mm, 3.25 mm and 3 mm are dug in the nozzle plate 43, but one having an orifice diameter of 3.25 mm is often used in the example described later.

The nozzle plate 43 is driven to select, for example, the ejection port 28 having an orifice diameter of 3.25 mm, and the ejection port 28 is pressed against the flange 45 having the O-ring 46 in the tube 44 to fixedly couple the tube 44 and the nozzle 28 to each other. This work can be carried out in the particulate size classifying chamber 41 kept at a low pressure or in vacuum without breaking the vacuum condition of low pressure.

In the downstream of the nozzle 28, the trapping plate 29 is placed at a distance twice as great as the inner diameter (the tip orifice diameter) of the nozzle, and as shown in FIG. 4, the trapping plate 29 can be scanned freely in a direction perpendicular to the nozzle 28 and in a circumferential direction by the drive mechanism 48.

In the example shown in the figure, a disc having a diameter of 10 cm is used for the trapping plate 29, the trapping plate 29 can be scanned in a longitudinal direction and a circumferential direction, the speed in the longitudinal direction is 1 mm/second and the rotational speed is 2 rpm at this time, and in this case, the surface (surface on which particulates are trapped) of the trapping plate 29 is coated with an anodized aluminum oxide film having a thickness of, for example, about 100 nm.

Figure 5:
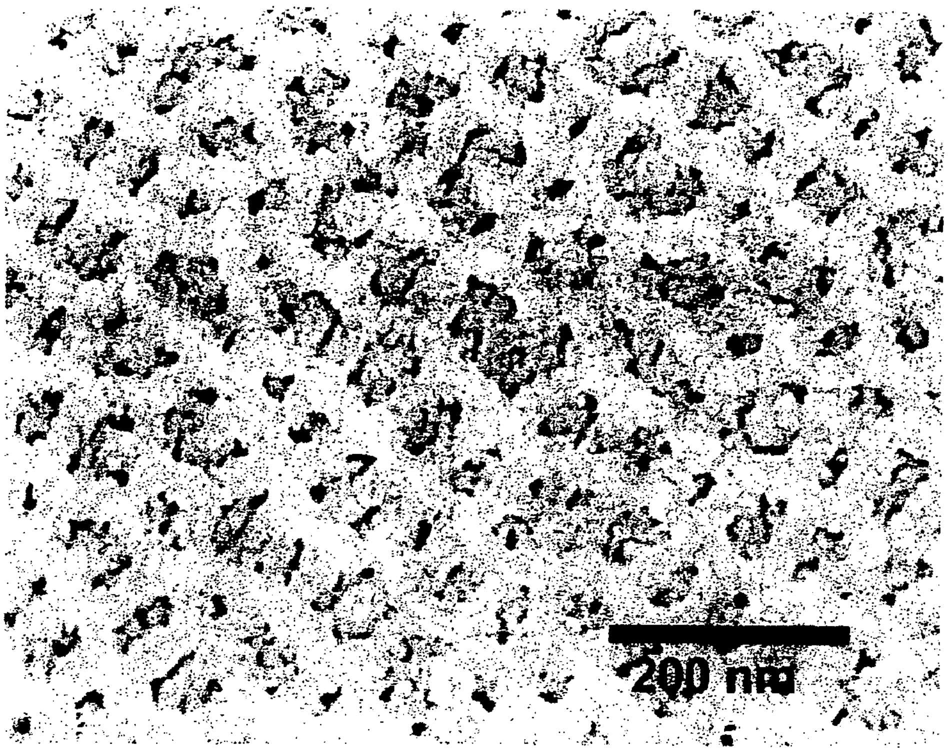
FIG. 5 shows an SEM image of the surface of a trapping plate coated with an anodized aluminum oxide film.

FIG. 5 shows an SEM (Scanning Electron Microscope) image of the surface of the trapping plate coated with an anodized aluminum oxide film.

Figure 6:
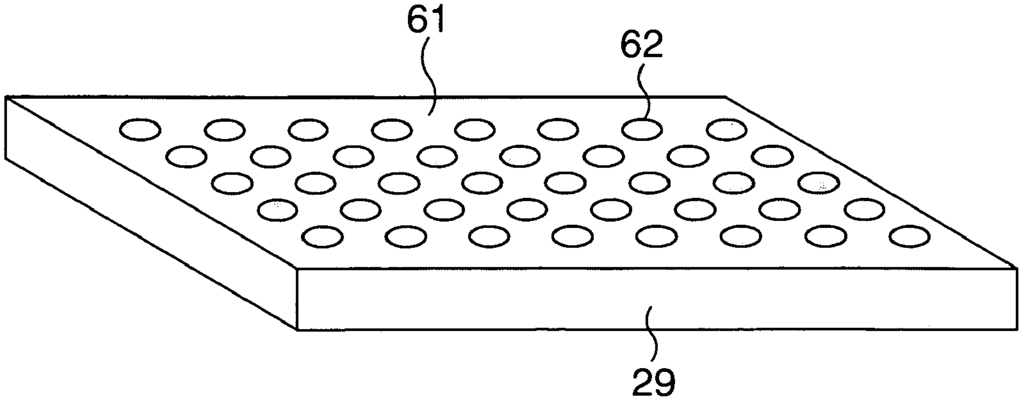
FIG. 6 is a perspective view of essential parts schematically showing a situation of the aluminum oxide film formed on the surface of the trapping plate.

An aluminum oxide film 61 formed on the surface of the trapping plate 29 has a porous structure as shown in, for example, FIG. 6, and each pore 62 is formed to have a pitch of about 50 nm, a diameter of about 20 nm to 25 nm and a depth of about 100 nm. In this connection, the pore size is variable, and is not limited to this value.

Figure 7:
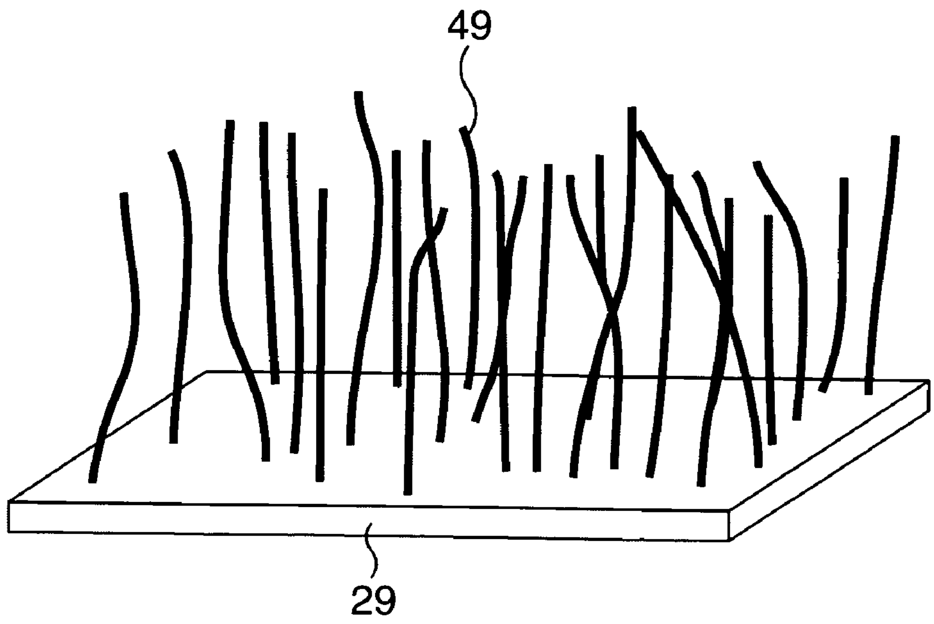
FIG. 7 is a slant view of essential parts showing one example in which carbon nanotubes are formed on the surface of the trapping plate.

Instead of the aluminum oxide film, carbon nanotubes may be formed on the surface of the trapping plate 29. FIG. 7 is a slant view of essential parts showing a situation in which carbon nanotubes are formed on the surface of the trapping plate 29.

Here, for inhibiting the rebound of particulates on the surface of the trapping plate 29, carbon nanotubes 49 were formed on the surface. On the surface of the trapping plate 29, carbon nanotubes 49 are orientationally grown upward from the surface of the trapping plate 29.

In this case, it is not necessary to specifically limit the diameter, the length and the number of carbon nanotubes 49, but it is known that a plate on which, for example, carbon nanotubes having a diameter of about 10 nm and a length of about 5000 nm are grown at a density of $10^{10}$ tubes per $cm^2$ is extremely useful as a trapping plate.

Figure 8:
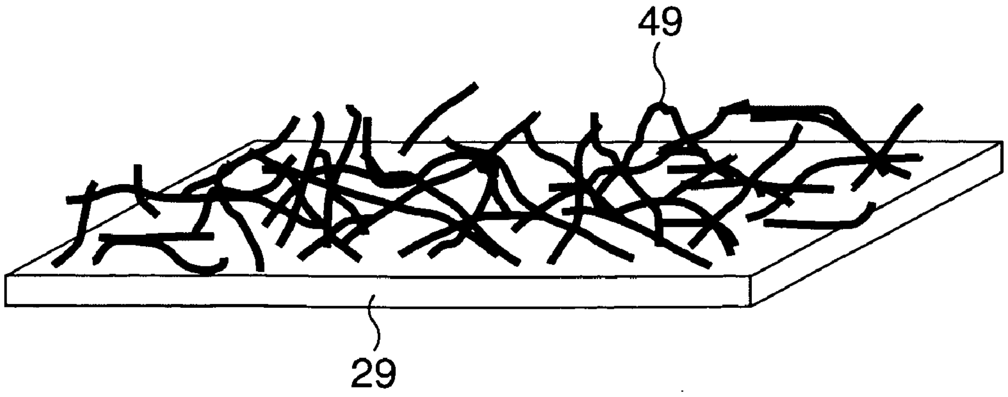
FIG. 8 is a slant view of essential parts showing another example in which carbon nanotubes are formed on the surface of the trapping plate.

FIG. 7 shows carbon nanotubes 49 oriented upward from the surface of the trapping plate 29, but the structure of FIG. 8 in which tubes 49 lie and are entangled is also effective.

Instead of forming carbon nanotubes, a configuration in which so called nanowires of silicon, zinc oxide and the like having a high aspect ratio structure are grown or placed on the surface of the trapping plate 29 is similarly effective. In this case, the diameter, the length, the number and the like are not limited, but it has been confirmed that a plate on which nanowires having, for example, a diameter of about 15 nm and a length of about 1000 nm are grown at a density of about $5\times10^9$ wires per $cm^2$ is effective.

A Silicon wafer may be used as a substrate in the trapping plate. In this case, the trapping plate can be replaced via a load lock or the like under vacuum or a low pressure as in conveyance of a wafer in a normal semiconductor process, and for fixation of the trapping plate on a holder, a hooked fastener may be used or an electrostatic chuck may be used.

When the flow rate of a particulate-containing carrier gas flowing to the ejection port 28 is 500 sccm and the pressure is $4.79\times10^2$ Pa (3.6 Torr), particulates with diameters of 1.5 nm or greater are deposited on the trapping plate 29. Particulates which have not been trapped are guided through the exhaust port 31 to the deposition chamber 32. In this example, the deposition chamber 32 is kept at a pressure of about $1.33\times10^{-3}$ Pa ($10^{-5}$ Torr) by differential pumping, so that particulates can reliably be deposited on the substrate 33 by inertia (see, for example, Patent Document 1).

In this example, the presence of the conductance adjusting gas exhaust port 26 is important. Here, for simplification of the situation, the conductance adjusting gas exhaust port 26 is a first exhaust port and the exhaust port 31 is a second exhaust port. How the amount and the size distribution of particulates deposited on the substrate 33 are changed with the amounts of helium gas flowing to the first exhaust port and the second exhaust port in this case will be described below. Here, for the amounts of gas flowing to the first exhaust port and the second exhaust port, the sizes of particulates, and the number of particulates, see the characteristic diagram of FIG. 9.

(1) First Exhaust Port: 0 slpm and Second Exhaust Port: 0.5 slpm

At this time, the pressure of the particulate generating chamber is $6.53\times10^2$ Pa (4.9 Torr) and the pressure of the impactor section is $5.07\times10^2$ Pa (3.8 Torr). In this case, on the impactor, nanoparticles with diameters of 1.5 nm or greater are trapped (in this case, referred to as cut size of 1.5 nm). As a result, the size distribution of particulates obtained in the downstream of the impactor becomes same as that seen in FIG. 9. Here, since the total flow rate is relatively low, 0.5 slpm, a large number of nanoparticles, particularly small nanoparticles, are deposited on the wall surface and lost in the transportation pipe between the generation chamber and the impactor. Actually, the amount of nanoparticles passing through the transportation pipe exponentially depends on the flow rate. As a result, the amount of nanoparticles obtained is relatively small.

(2) First Exhaust Port: 0 slpm and Second Exhaust Port: 1 slpm

In this case, the pressure of the particulate generating chamber is $1.09\times10^3$ Pa (8.2 Torr) and the pressure of the impactor section is $9.2\times10^2$ Pa (6.9 Torr) due to an increase in flow rate. Here, unless the inner diameter of the nozzle is changed, the cut size increases to 2.5 nm due to an increase in pressure. The distribution of nanoparticles at this time is same as that shown in FIG. 9. In this case, the loss of nanoparticles in the transportation pipe should be relatively small because of the high flow rate. Actually, the amount of relatively large nanoparticles was found to increase. However, the amount of smaller nanoparticles, e.g. particles of 1 nm to 2 nm, did not particularly increase. This is because smaller nanoparticles are hard to be obtained if the pressure of the generation chamber is high.

This problem would be solved if the pressure of the generation chamber could be reduced, but since the exhaust amount is limited by the nozzle, the problem cannot easily be solved. This result cannot be a good result when the purpose is to obtain small nanoparticles, but conversely, small nanoparticles could be reduced to narrow the size distribution, meaning that an effect in another aspect can be obtained.

(3) First Exhaust Port: 0.5 slpm and Second Exhaust Port: 0.5 slpm

For obtaining smaller nanoparticles, i.e. nanoparticles of 1 nm to 2 nm in a large amount, the total flow rate is set to 1 slpm, 0.5 slpm of which is discarded through the first exhaust port. In this case, despite the total flow rate of 1 slpm, the pressure of the generation chamber is about $7.46\times10^2$ Pa (5.6 Torr) and there is not a significant increase in pressure, since 0.5 slpm is discharged in the upstream of the nozzle which is not affected by the conductance of the nozzle.

Therefore, relatively small particulates are generated, and further, the rate of flow through the transportation pipe is 1 slpm, and therefore the loss is low as compared to the above case (1), and the passage rate increases by a factor of 10 or greater when the size is 1.5 nm.

Figure 9:
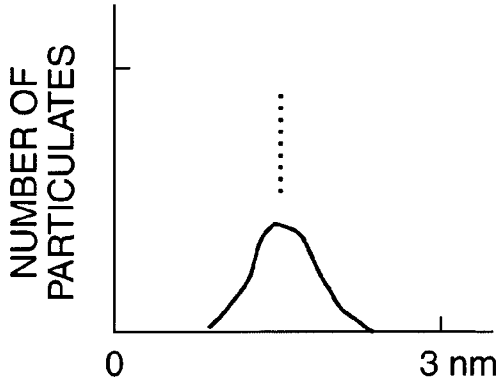
FIG. 9 is a characteristic diagram showing the amount and size distribution of particulates deposited on a substrate.
Figure 9:
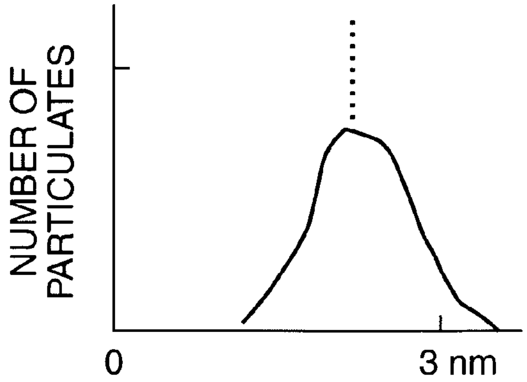
Figure 9:
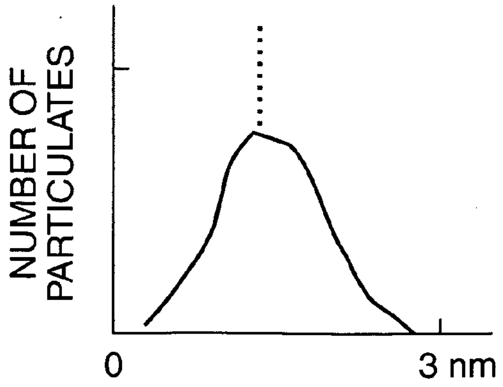

As a result, even though a half of the total amount of nanoparticles is discarded, a larger number of smaller particles are ultimately obtained. In this case, the pressure of the impactor section is same as that in the above case (1) and the cut size remains unchanged. However, for the size distribution of nanoparticles obtained in the downstream of the impactor, smaller nanoparticles are obtained in a large amount as seen in FIG. 9.

As described above, it will be understood that by a simple configuration in which a new exhaust port is provided in the upstream of the nozzle of the impactor, the size distribution or the amount of nanoparticles can be controlled satisfactorily as compared to the conventional technique. The amount of nanoparticles after size classification is about 100 times as large as the amount when DMA is used, thus obtaining a very favorable result in pursuing applications of nanoparticles.

The results of classifying nanoparticles by the particulate size classification apparatus of example 1 will now be described based on comparison with a comparative example.

Figure 10A:
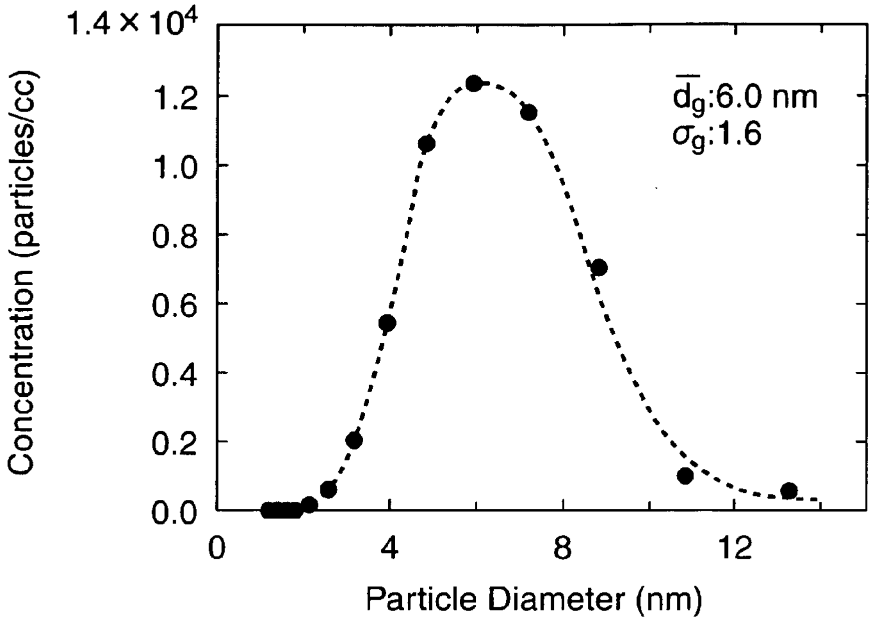
FIGS. 10A and 10B are distribution charts showing results of classifying nanoparticles by the particulate size classification apparatus based on a comparison with a comparative example.

FIG. 10A shows a comparative example showing a diameter distribution of particulates when there is only laser ablation and no classification unit, which is introduced in Non-Patent Document 4. Thus, generally, the geometric standard deviation of the particulate size is often about 1.6 to 2.0 when there is no classification unit. Here, the geometric standard deviation of, for example, 1.6 is almost equivalent to the standard deviation of about 60%.

Figure 10B:
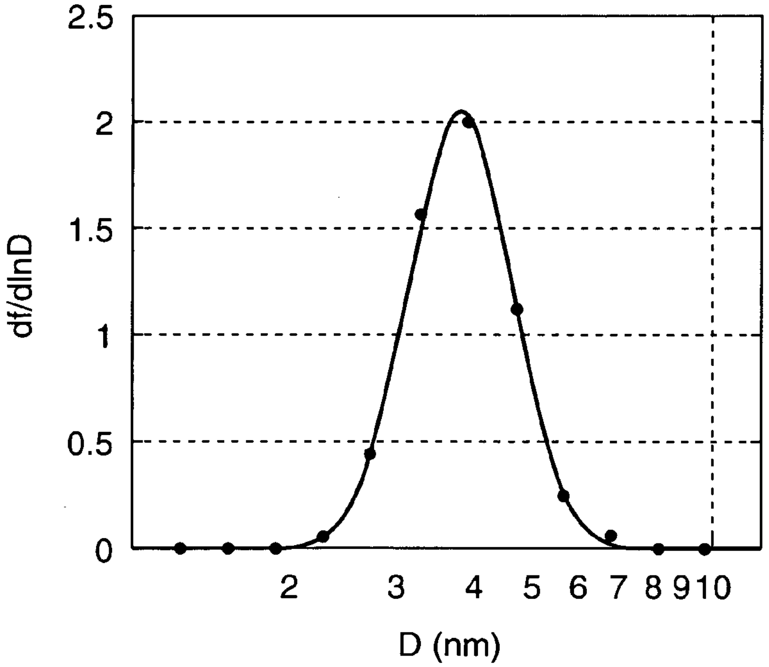

FIG. 10B shows one example showing a size distribution of particulates when using the particulate size classification apparatus (having, for example, an apparatus configuration similar to that of FIG. 3 in example 1 and having a discoid trapping plate as particulate trapping unit) according to the present invention. The type of particulates was cobalt, the flow rate of He as a carrier gas was 1.9 slpm, the tip orifice diameter of the nozzle was 5.5 mm, and the pressure of the inside of the particulate size classifying chamber was 840 Pa. The rate of flow to the conductance adjusting exhaust port was 0. In this case, the size distribution was very narrow with the geometric average of 3.8 nm and the geometric deviation of 1.21. Thus, by using the particulate size classification apparatus comprising the impactor according to the present invention, nanoparticles relatively uniform in size can be obtained.

Example 2

In this example, another configuration of the impactor, especially particulate trapping unit, will be described.

In example 1, a discoid trapping plate was used as particulate trapping unit, and the trapping plate was scanned in vertical and lateral directions or in a rotation direction to change the position of the trapping of particulates.

Figure 11:
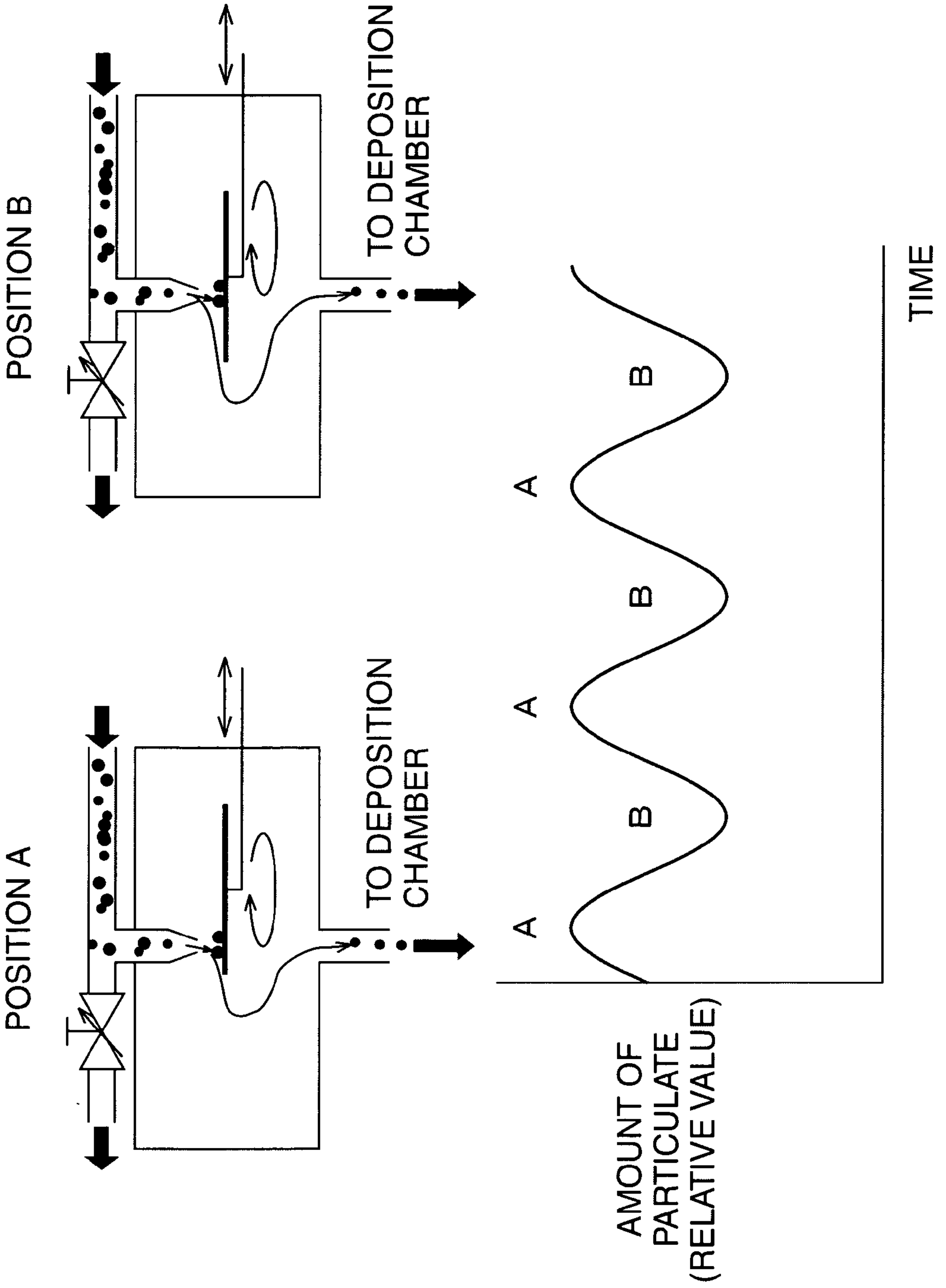
FIG. 11 is a characteristic diagram for explaining a few problems in example 1.

However, when the configuration of example 1 is employed, the distance in which particulates that are not trapped pass on the trapping plate varies depending on the relative position of the nozzle and the trapping plate. Since some of such particulates are trapped on the trapping plate when passing on the trapping plate, there is concern that the amounts of particulates introduced into the particulate deposition chamber (e.g. particulate deposition chamber 32 of FIG. 3) through the impactor vary by several tens % between positions A and B shown in FIG. 11. Further, the sizes of particulates introduced into the particulate deposition chamber also vary.

Figure 12:
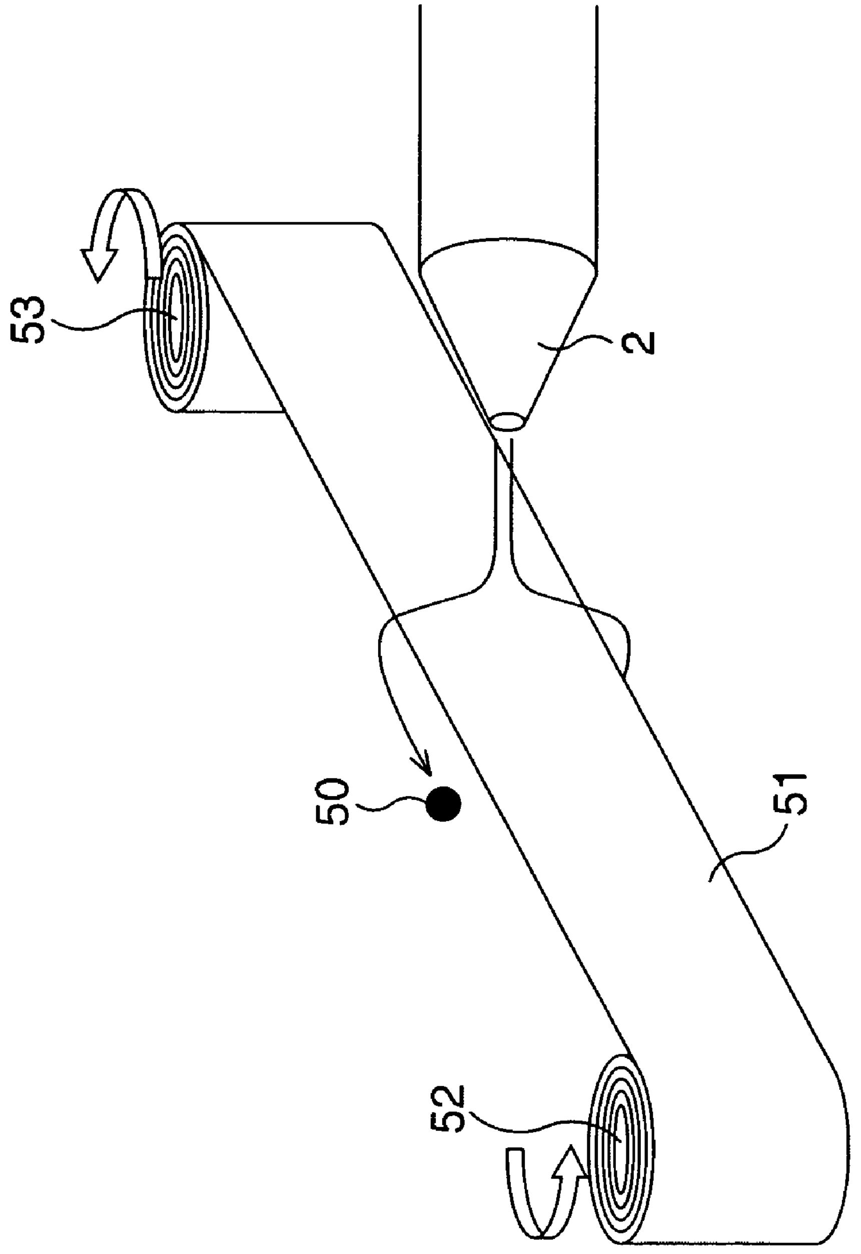
FIG. 12 is a slant view of essential parts showing a situation of the trapping plate in example 1.

In this example, a belt-like trapping sheet 51 is used as particulate trapping unit in place of the trapping plate 3 (29) as shown in FIG. 12 for solving a few problems of the configuration of example 1 of the present invention.

The trapping sheet 51 moves only in a longitudinal direction over time, and in the example shown in the figure, it is configured to be wound up in, for example, the direction of the arrow shown in the figure from one end portion 52 toward the other end portion 53. Owing to such a configuration, the distance in which particulates 50 pass on the trapping sheet 51 is always constant (about half value of the width of the trapping sheet 51), and particulates 50 are always oriented to a fresh portion of the surface of the trapping sheet 51 which has no deposited particulates (trapped or passing without being trapped; the example shown in the figure illustrates a case where particulates pass).

The trapping sheet 51 has its surface coated with an anodized aluminum oxide film as in the trapping plate 29 (e.g. state of FIG. 6). A configuration in which carbon nanotubes are formed on the surface (e.g. state similar to that of FIG. 7 or 8), or nanowires of silicon, zinc oxide and the like having a high aspect ratio structure are grown or placed on the surface of the trapping sheet 51, instead of the aluminum oxide film, is also suitable.

In this example, the tip orifice diameter of the nozzle 2 is about 3.25 mm, and the length of the shorter side of the trapping plate is about 20 mm. In this example, a configuration in which carbon nanotubes are grown in a thickness of about 5 μm, as in FIG. 7, on a stainless sheet having a thickness of about 50 μm is used as the trapping sheet 51. The feeding speed of the trapping sheet 51 is, for example, about 0.05 mm/s. Since the trapping sheet 51 is in the form of a roll, it can be used for a long time without necessity of replacement in a short time. As a result of using the trapping sheet 51 as particulate trapping unit, time variations in the amount of particulates introduced into the particulate deposition chamber decreases to a low value, i.e. several % or less.

The present invention may be carried out with many configurations including the embodiments and examples described above.

According to the present invention, particulates called nanoparticles can reliably and easily be classified according to size with high throughput, and particulates uniform in size can be put to practical use in a large amount. The particulate size classification apparatus and method can be used without concern of insufficient supply in the electric area of luminescent materials and the areas of cosmetic materials and the like.

What is claimed is:

1. A particulate size classification apparatus comprising:
a particulate size classifying chamber provided with an exhaust port for particulates;
a particulate introducing unit having a nozzle ejecting to the inside of the particulate size classifying chamber a carrier gas containing particulates to be classified; and
a particulate trapping unit provided in the particulate size classifying chamber and selectively trapping particulates ejected from the nozzle,
wherein among the particulates ejected from the nozzle, particulates made uniform in size by not being trapped by the particulate trapping unit are ejected from the exhaust port; and
wherein the particulate introducing unit has a particulate introduction pipe introducing the carrier gas into the particulate size classifying chamber, and
the nozzle has a plurality of ejection ports having orifice diameters of different sizes, and is placed separately from the particulate introduction pipe so that the selected ejection port is connected to the particulate introduction pipe.

2. The particulate size classification apparatus according to claim 1, wherein the inside of the particulate size classifying chamber is kept at a low pressure of $2.67\times10^3$ Pa or lower at the time of size classification of particulates.

3. The particulate size classification apparatus according to claim 1, wherein the particulate trapping unit is a discoid member having a rotational axis perpendicular to the surface and made rotatable at a predetermined speed, and is placed so as to be movable vertically and laterally.

4. The particulate size classification apparatus according to claim 3, wherein the particulate trapping unit is placed so as to be replaceable in the particulate size classifying chamber kept at a low pressure.

5. The particulate size classification apparatus according to claim 1, wherein the particulate trapping unit is a trapping sheet.

6. The particulate size classification apparatus according to claim 5, wherein in the particulate trapping unit, the position at which particulates ejected from the nozzle can be shifted in a longitudinal direction over time so that the trapping position changes.

7. The particulate size classification apparatus according to claim 1, wherein the particulate trapping unit has a surface having a porous structure.

8. The particulate size classification apparatus according to claim 1, wherein the particulate trapping unit has an aluminum oxide film formed on the surface.

9. The particulate size classification apparatus according to claim 1, wherein the particulate trapping unit has carbon nanotubes provided on the surface.

10. The particulate size classification apparatus according to claim 1, wherein the particulate trapping unit has carbon nanowires provided on the surface.

11. The particulate size classification apparatus according to claim 1, wherein the particulate introducing unit has a gas exhaust port for the carrier gas separately from the nozzle.

12. The particulate size classification apparatus according to claim 11, wherein the particulate introducing unit has a valve adjusting the flow rate of the carrier gas in the upstream of the gas exhaust port, and by adjustment of the valve, the flow rates in the gas exhaust port and the nozzle are each controlled.

13. A particulate size classification method, wherein the particulate introducing unit has a particulate introduction pipe introducing a nozzle and a carrier gas into a particulate size classifying chamber, and the nozzle has a plurality of ejection ports having orifice diameters of different sizes, and is placed separately from the particulate introduction pipe so that the selected ejection port is connected to the particulate introduction pipe, and wherein the carrier gas containing particulates to be classified is ejected to the inside of the particulate size classifying chamber from the nozzle, particulates are selectively trapped by particulate trapping unit provided in the particulate size classifying chamber, and particulates made uniform in size by not being trapped by the particulate trapping unit are collected.

14. The particulate size classification method according to claim 13, wherein the inside of the particulate size classifying chamber is kept at a low pressure of $2.67 \times 10^3$ Pa or lower at the time of size classification of particulates.

15. The particulate size classification method according to claim 13, wherein the particulate trapping unit is a discoid member having a rotational axis perpendicular to the surface and made rotatable at a predetermined speed, and is placed so as to be movable vertically and laterally.

16. The particulate size classification method according to claim 13, wherein the particulate trapping unit is a trapping sheet.

17. The particulate size classification method according to claim 16, wherein in the particulate trapping unit, the position at which particulates ejected from the nozzle can be shifted in a longitudinal direction over time so that the trapping position changes.

18. The particulate size classification method according to claim 13, wherein the carrier gas is ejected to the inside of the particulate size classifying chamber by the nozzle provided in the particulate size classifying chamber, and wherein the flow rate of the carrier gas is adjusted by a exhaust port provided in the upstream of the nozzle exhausting the carrier gas and a valve provided with an exhaust port.

19. The particulate size classification method according to claim 13, wherein a gas exhaust port for the carrier gas is provided separately from the nozzle, a valve adjusting the flow rate of the carrier gas is provided in the upstream of the gas exhaust port, and the flow rates of the carrier gas in the gas exhaust port and the nozzle are each controlled by adjustment of the valve.

* * * * *